US011726847B2

(12) United States Patent
Weinstein et al.

(10) Patent No.: US 11,726,847 B2
(45) Date of Patent: Aug. 15, 2023

(54) SCALABLE ACTIONS FOR USER DATA REQUESTS

(71) Applicant: DOORDASH, INC., San Francisco, CA (US)

(72) Inventors: Jay B Weinstein, Fremont, CA (US); Venkataramanan Kuppuswamy, San Jose, CA (US)

(73) Assignee: DOORDASH, INC., San Francisco, CA (US)

( * ) Notice: Subject to any disclaimer, the term of this patent is extended or adjusted under 35 U.S.C. 154(b) by 0 days.

(21) Appl. No.: 17/474,159

(22) Filed: Sep. 14, 2021

(65) Prior Publication Data
US 2022/0206883 A1 Jun. 30, 2022

Related U.S. Application Data

(63) Continuation of application No. 17/133,837, filed on Dec. 24, 2020, now Pat. No. 11,132,242.

(51) Int. Cl.
G06F 9/54 (2006.01)
H04L 67/133 (2022.01)

(52) U.S. Cl.
CPC .............. G06F 9/547 (2013.01); G06F 9/546 (2013.01); H04L 67/133 (2022.05)

(58) Field of Classification Search
CPC .. G06F 9/54–547; H04L 67/133; H04L 67/52
See application file for complete search history.

(56) References Cited

U.S. PATENT DOCUMENTS

| 2019/0319885 | A1* | 10/2019 | Fan ........................ H04L 67/60 |
| 2019/0320442 | A1 | 10/2019 | Thies et al. |
| 2019/0340388 | A1* | 11/2019 | Eidson .................... G06F 9/542 |
| 2020/0314104 | A1* | 10/2020 | Achyuth ............. G06F 21/6218 |
| 2020/0341876 | A1* | 10/2020 | Gandhi ................... G06F 9/546 |
| 2021/0141913 | A1* | 5/2021 | Mosconi ............. G06F 21/6245 |

* cited by examiner

Primary Examiner — Brian W Wathen
(74) Attorney, Agent, or Firm — Mattingly & Malur, PC

(57) ABSTRACT

In some examples, a computing device may receive a user request and may determine a user jurisdiction associated with the received user request. Based at least on a request type and the user jurisdiction, the computing device may select a first policy file from among a plurality of policy files, the plurality of policy files preconfigured for respective different combinations of at least the request type and the user jurisdiction to contain at least one data action for instructing at least one respective target subsystem to perform the at least one data action in response to a respective user request. In addition, the computing device may send, based on a data action included in the first policy file, at least one instruction to at least one target subsystem.

20 Claims, 6 Drawing Sheets

SCALABLE ACTIONS FOR USER DATA REQUESTS

CROSS-REFERENCE TO RELATED APPLICATION

This application is a continuation of, and claims priority to, U.S. patent application Ser. No. 17/133,837, filed Dec. 24, 2020, issued as U.S. Pat. No. 11,132,242, and which is incorporated by reference herein.

BACKGROUND

Various government entities have established various levels of rights for users of online services to be able to view data collected about them and/or have the data about them be deleted, removed, obfuscated or otherwise forgotten from electronic records, such as databases, search indexes, and the like. As one example, when a user of a service initiates a request to forget the user's data from the records of the entity that provided the service, the entity may have employees that receive the request and manually remove the user's data from the entity's records. Thus, conventional solutions may rely heavily on human execution, monitoring, and verification. Accordingly, these solutions do not scale well for large businesses and other entities that may store data that is widely distributed across multiple services, subsidiaries, departments, locations, different business partners, and so forth, each of which might maintain and manage their own data records with information about users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
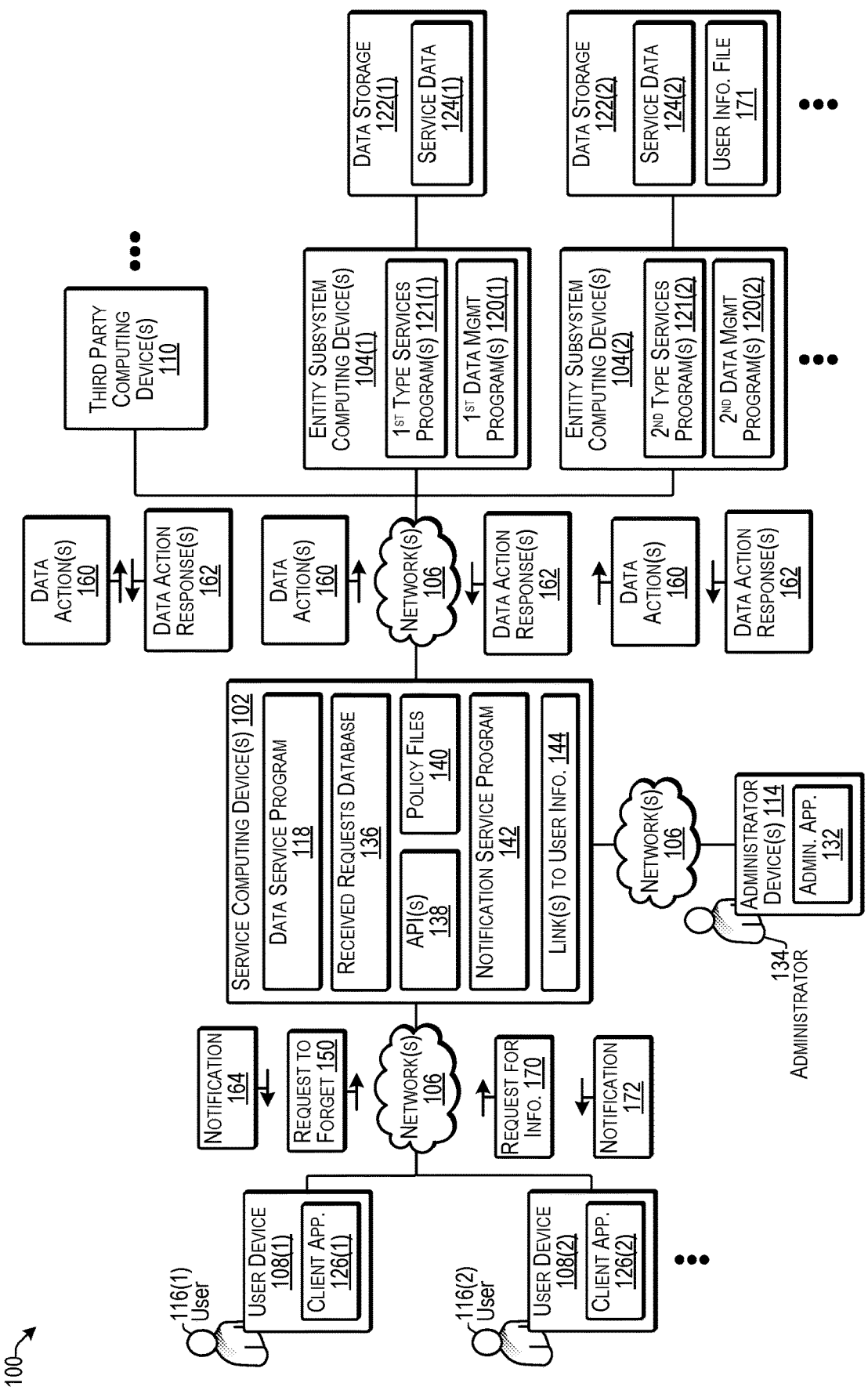
FIG. 1 illustrates an example architecture of a distributed computing system able to process and respond to user requests according to some implementations.

Some implementations herein include techniques and arrangements for managing and responding to user data requests, such as requests to forget user data and user information requests, without requiring human intervention. For instance, the service herein may provide scalable policy-based control and confirmation of actions that are performed in response to requests to forget and user information requests. In some cases, the service may include a back-end service able to receive the requests to forget or user information requests from user devices, such as via respective user interfaces presented on the user devices. In response, the service may execute the policy-based action to automatically determine the implicated downstream subsystems and send instructions to the determined downstream subsystems in an easily scalable and extensible manner. Accordingly, implementations herein provide a technical solution to the problems of the lack of scalability and lack of extensibility found in conventional systems.

Some examples herein may enable a user of a service to request, receive, or otherwise view all the personal information the service-providing entity has stored about the user. Further, some examples may autonomously determine how to carry out and complete a user request to forget, such as by one or more of deleting, obfuscating, anonymizing, removing, shredding, discarding, or otherwise forgetting all personally identifiable information associated with a user from the service's records, databases, and other stored data of the service and any affiliated third parties. For example, forgetting data by obfuscating data may include changing or deleting at least a portion of the data to ensure that the data is no longer traceable to, or otherwise associated with, the particular user. Further, completing a user request to forget user data may further include forgetting the user by one or more of deleting the user, deactivating the user, unsubscribing the user from receiving communications, anonymizing the user, obfuscating the user, or the like. Additionally, some examples may configure a computing device to trigger, verify, and retry downstream actions for responding to user requests, as well as providing internal visibility for such user requests.

Forgetting user data in response to receiving a user's request to forget, such as a "right to be forgotten" request or the like, may involve complex orchestration and monitoring of actions across a plurality of different downstream subsystems, which may include partner systems or other third party systems in some cases. In addition, if a user submits a "right to information" request to view the information about the user maintained by the service, the system may execute data actions configured to collect the information from disparate locations, and provide the requested information to the user without administrator or other manual intervention.

In some cases, the service may receive a request to forget or a request for information from a user device via an application programming interface (API) or other electronic communication techniques. For instance, the request may be submitted by the user via a user interface presented on a display associated with the user device. The request may be transmitted by the user device according to the API following receipt of the request through the user interface on the user device. In some examples, the API may enable authentication of the request before the request is forwarded to a data service program executing on one or more service computing devices associated with the service. For example, the API may request an authentication action from the user before forwarding the request to a data service program. For instance, the API may request a user passcode or other user credential, secondary authentication, or the like.

The data service program may be configured to apply a plurality of policies for responding to the user requests. For instance, policies and corresponding data actions may be defined using a plurality of policy files, which may be files or other types of data structures deployed with the data service program. As one example, the policy files may be JSON files, although implementations herein are not limited to any particular file type or other data structure type. In addition, each policy file may be defined with a system-unique identifier (ID) and may specify or otherwise include a set of one or more data actions to be performed to complete a received request. For instance, each data action may represent one or more operations to be executed by a downstream subsystem for responding, at least in part, to the user request. The data actions may be strictly ordered in some examples so that, for a plurality of successive actions, a first action is instructed prior to a second action being instructed, the second action is instructed prior to a third action being instructed, and so forth. A corresponding downstream subsystem may maintain internal implementation details for performing a particular data action instructed by the data service program. Further, in some cases, the data actions are not strictly ordered, and may be instructed in parallel, or in no particular order, or the like.

The data service program may be executed for selecting a particular policy file in response to a particular user request and performing corresponding data actions for responding to the user request. For instance, the data service program may execute decision-making logic for selecting the correct policy file for responding to a particular user request. As one example, there may be a separate policy file for each unique combination of various factors, such as user type, user request type, user location and corresponding user jurisdiction, services used by the user, and so forth. Thus, the data program may be executed to determine the policy file to select based at least on receiving the user request, and further based on determining information about the user making the request, such as a location associated with the user, legal requirements that apply to the user's location, a user type of the user that submitted the request, and so forth.

In addition, the system herein may provide pluggable support for multiple types of downstream transport of instructions. For instance, the system may employ various different communication protocols (such as GRPC, APACHE KAFKA, and the like) for various different types of downstream subsystems and services. Further, the data service program may integrate with downstream service subsystems via a live API and may also integrate with downstream batch-type subsystems. The downstream subsystems may provide acknowledgements and other responses synchronously and/or asynchronously, and orchestration of the data actions may be distributed and scalable. Further, the system may monitor the data actions and responses to the data actions, and may retry or otherwise repeat a data action if the downstream subsystem does not provide a reply or provides an incorrect reply.

The system herein is both extensible to support new types of downstream subsystems and is scalable to any practical size of the downstream subsystems. Additionally, the system provides central monitoring of the status of each received user request. Further, the system provides auditing and review of the user requests, and may provide a delay in completing some types of user requests, such as for security purposes or the like. For example, additional or different data management laws for additional jurisdictions may be incorporated into the system by adding one or more new policy files that include a set of data actions that conform with the requirements of the particular additional jurisdiction. In addition, the system herein may be highly efficient while enabling a distributed and scalable orchestration of services with centralized automated monitoring and centralized state management.

For discussion purposes, some example implementations are described in the environment of one or more service computing devices in communication with one or more other computing devices, such as for performing data actions for forgetting data, retrieving data, or otherwise responding to user requests. However, implementations herein are not limited to the particular examples provided, and may be extended to other types of computing system architectures, other types of computing environments, other types of client configurations, other types of software, other types of data requests, other types of data, and so forth, as will be apparent to those of skill in the art in light of the disclosure herein.

FIG. 1 illustrates an example architecture of a distributed computing system 100 able to process and respond to user requests according to some implementations. In some cases, the distributed computing system 100 may be configured for automatically responding to user data requests, such as requests to forget and user information requests, without human intervention. In the example of FIG. 1, the distributed computing system 100 includes one or more service computing devices 102 that may communicate with one or more entity subsystem computing devices 104 over one or more networks 106, such as entity subsystem computing devices 104(1), 104(2), . . . .

In addition, the service computing device(s) 102 may communicate over the network(s) 106 with one or more user devices 108, such as user devices 108(1), 108(2), . . . . Furthermore, at least the service computing device(s) 102 may communicate over the one or more networks 106 with one or more third party computing devices 110. In addition, at least the service computing device(s) 102 may communicate over the one or more networks 106 with one or more administrator computing devices 114.

The one or more networks 106 may include any appropriate network, including a wide area network (WAN), such as the Internet; a local area network (LAN), such as an intranet; a wireless network, such as a cellular network; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Accordingly, the service computing device(s) 102, the entity subsystem computing device(s) 104, the user device(s) 108, the third party computing device(s) 110, and the administrator device(s) 114 are able to communicate over the one or more networks 106 using wired or wireless connections, and combinations thereof.

In some examples, the service computing device(s) 102 may include one or more servers that may be embodied in any number of ways. For instance, the programs, other functional components, and at least a portion of data storage of the service computing device(s) 102 may be implemented on at least one server, such as in a cluster of servers, a server farm, a data center, a cloud-hosted computing service, and so forth, although other computer architectures may additionally or alternatively be used. Additional details of the service computing device(s) 102 and the other computing devices discussed herein are discussed below with respect to FIG. 6.

The service computing device(s) 102 and the entity subsystem computing devices 104 may be configured to provide services to users 116, such as a first user 116(1) associated with the first user device 108(1), a second user 116(2) associated with the second user device 108(2), and so forth. For instance, the service computing device(s) 102 may execute a data service program 118 that may be executed to cause the service computing device(s) 102 to perform various functions for responding to user data requests, such as requests to view user information and/or requests to forget user information provided or generated by the users 116 through use of the services offered by an entity. The service computing device(s) 102 may also perform various other functions, as discussed additionally herein.

The entity subsystem computing device(s) 104 may include one or more servers that may be embodied in any number of ways. For instance, the programs, other functional components, and at least a portion of data storage of the each of the entity subsystem computing devices 104 may be implemented on at least one server, such as in a cluster of servers, a server farm, a data center, a cloud-hosted computing service, and so forth, although other computer architectures may additionally or alternatively be used. Each of the entity subsystem computing device(s) 104(1), 104(2), . . . , may execute one or more data management programs 120(1), 120(2), . . . , respectively, for managing data generated or otherwise used by respective services provided by an entity to the users 116. For instance, the entity subsystem computing device(s) 104(1) may execute one or more first type services programs 121(1), while the entity subsystem computing device(s) 104(2) may execute one or more second type services programs 121(2), that differ from the first type services. Examples of subsystems and types of data stored are discussed additionally below, e.g., with respect to FIG. 2.

Each type of service 121 may receive, generate or otherwise use service data 124 that may be stored and managed by the respective data management program 120 for that type of service 121. For example, the first type services program 121(1) may use service data 124(1) that may be stored in a data storage 122(1) and managed by the first data management program(s) 120(1). Similarly, the second type services program 121(2) may use service data 124(2) that may be stored in a data storage 122(2) and managed by the second data management program 120(2). There may be any number of different types of services provided by the entity depending on the nature of the operations engaged in by the entity.

Each user device 108 may be any suitable type of computing device such as a desktop, laptop, workstation, server, tablet computing device, mobile device, smart phone, wearable device, terminal, and/or any other type of computing device able to send and receive data over a network. The users 116 may be associated with the user devices 108 such as through a respective user account, user login credentials, or the like. Furthermore, the user devices 108 may be able to communicate with the service computing device(s) 102 and the entity subsystem computing device(s) 104 through the one or more networks 106, through separate networks, or through any other suitable type of communication connection.

Further, each user device 108 may include a respective instance of a client application 126 that may execute on the user device 108, such as, client application 126(1), 126(2), . . . . Each client application 126 may be configured for communicating with the data service program 118 and, in some cases, with at least one of the services 121 offered by the entity. As one example, the application 126 may include a browser or may operate through a browser such as in the case of web application, while in other examples, the client application 126 may include any other type of application, such as a mobile application in the case that the user device is a mobile device, or the like. The application 126 may have communication functionality enabling communication with the service computing device(s) 102, and in some cases, with the entity subsystem computing device(s) 104 and/or third party computing devices 110.

The third party computing devices 110 may include computing devices of a third party that may be a separate entity from the service-providing entity that provides services to the users 116.

In some examples, the one or more administrator devices 114 may be configured to send administrative instructions to the service computing device(s) 102, such as over the one or more networks 106 or through any other suitable connection type. For instance, each administrator device 114 may include a respective instance of an administrator application 132 that may execute on the administrator device 114, such as for communicating with the data service program 118 for controlling settings, functions, and other aspects of the data service program 118. For instance, an administrator 134 may use the administrator application 132 for sending management instructions for managing the service computing device(s) 102 and/or the data service program 118, and may receive data from the service computing device(s) 102. In some cases, the administrator application 132 may include a browser or may operate through a browser, while in other cases, the administrator application 132 may include any other type of application having communication functionality enabling communication with the service computing device(s) 102.

The service computing device(s) 102 may execute the data service program 118, which may perform the functions discussed herein, including at least some of the functions discussed with respect to FIGS. 2-5. For example, the data service program 118 may receive user requests from the user devices 108, and may store the received user requests in a received request database 136. In some examples, the received request database 136 may be a relational database, table, or the like; however, implementations herein are not limited to any particular database type or any particular type of data structure for the received request database 136.

In some cases, the user requests may be received via one or more APIs 138, such as a REST API or the like. Upon receipt of a user request, the data service program 118 may determine, from amongst a plurality of policy files 140, a particular policy file 140 to which the user request applies. As discussed additionally below, the data service program 118 may execute one or more worker threads that may be configured to access the received requests database 136 to retrieve a received request for processing. The worker thread may select a particular policy file 140 and may apply the data actions within the selected policy file 140 for responding to the user request. In addition, the service computing device(s) 102 may include a notification service program 142 that may send notifications for responding to user requests in some cases. Further, the service computing device(s) 102 may store, at least temporarily, link(s) to user information 144 collected by the system in response to user requests for information as discussed additionally below.

As one example, suppose that the first user 116(1) causes the first user device 108(1) to execute the first client application 126(1) to send a request to forget 150 to the service computing device(s) 102. For instance, the client application 126(1) may present a user interface that enables the first user 116(1) to select an option for requesting that the service-providing entity forget all of the first user's data. As mentioned above, in response to the request to forget 150, the system may forget the user and the user's data by one or more of deleting, obfuscating, anonymizing, removing, shredding, discarding all personally identifiable information associated with the user, as well as one or more of deleting the user, deactivating the user, unsubscribing the user from receiving communications, anonymizing the user, obfuscating the user, or the like. In response to receiving the request to forget 150, the data service program 118 may determine the user type of the first user 116(1) such as consumer, independent contractor, employee, service-providing partner, or the like. For example, the data service program 118 may access a user profile of the first user 116(1), such as based on a user identifier (ID) transmitted with the request to forget 150 via the API, or otherwise determined based on communication with the client application 126(1). The data service program 118 may further determine a user location associated with the first user 116(1), which indicates the applicable jurisdictional requirements that apply to the first user 116(1), and a request type of the request 150.

Based on the information determined about the first user 116(1) and the received request to forget 150, the data service program 118 may select one of the policy files 140 for responding to the request to forget 150. Based on the contents of the selected policy file 140, the data service program 118 may send a plurality of data actions 160 to selected entity subsystem computing devices 104 and, in some cases, to one or more of the third-party computing devices 110. As one example, the data actions 160 may correspond to service level agreements between the data service program 118 and the downstream subsystems and services that are the targets of the data actions 160. In addition, in the case of a request to forget, the data service program 118 may wait for a threshold period of time to elapse before sending the plurality of data actions 160 such as to protect against fraud or other malfeasance, and to also allow the requesting user a grace period to withdraw the request to forget. The service computing devices 102 may receive a plurality of data action responses 162 from the respective entity subsystem computing devices 104 and, in some examples from the third-party computing devices 110.

Furthermore, the notification service program 142 may be invoked by the data service program 118 to send an acknowledgement communication or other notification 164 to the first user device 108(1) indicating that the request to forget 150 has been received and either has been performed or will be performed. For instance, the notification 164 may be sent via email, text message, or any other suitable electronic communication technology. In other examples, rather than using the notification service program 142, the data service program 118 may send communications directly to the client applications 126, such as via the one or more APIs 138.

As another example, suppose that the second user 116(2) uses the client application 126(2) on the second user device 108(2) to send a request for information 170 to the service computing device(s) 102, such as via the one or more APIs 138. In response, the data service program 118 may access the user profile of the second user 116(2) to determine a user type, user location, user legal jurisdiction, and the like. Accordingly, based on this information about the user and the request type, the data service program 118 may select a particular policy file 140 to use for responding to the request 170. As one example, as discussed additionally below, the data service program 118 may invoke a plurality of worker threads that may periodically check the received request database 136 for selecting a received request to be performed. For instance, based on a selected request, the worker thread may select a particular policy file 140 for performing the request. Using the selected policy file 140, the worker thread may send instructions for performing data actions 160 based on a set of data actions contained in the selected policy file 140.

In response, the service computing device(s) 102 may receive one or more data action responses 162, one or more of which may include a link to user information 144 that was collected by one or more targeted downstream subsystems based on the data actions 160 performed in response to the user request for information 170. For instance, one or more of the subsystems may collect all the user information for the second user 116(2) and may store the collected information in a user information file 171 at a network storage location such as at the data storage 122(2) in this example. Further, the one or more subsystems may provide a data action response 162 that includes information for accessing the user information file 171 at the network storage location, such as URL (uniform resource locator) or other link 144 to network storage location. Upon receipt of the link 144 to user information from the subsystem, the data service program 118 may invoke the notification service program 142 to send a notification 172 to the user device 108(2) indicating that the requested user information is available to be accessed by the user 116(2). As one example, the notification 172 may include a selectable link for the user 116(2) to select to download or otherwise view the user information stored in the user information file 171 at the network storage location. In some cases, the link provided to the user device 108(2) may be the same as the link 144 provided by the subsystem, while in other examples, the link provided to the user device 108(2) may, when selected by the user 116(2), cause the data service program 118 to access the network storage location and provide the user information file 171 to the user device 108(2). In some examples, the collected user information may be maintained available for access by the user 116(2) for threshold time period, and may then be removed from the storage location, or access by the user 116(2) may be terminated or otherwise restricted.

In addition, in some cases, the administrator 134 may send a request to forget 150 and/or a request for information 170 on behalf of a user. For example, a user 116 may contact the administrator 134 regarding the request. In response, the administrator 134 may use the administrator device 114 to send the request, and may provide authorization for the request. The data service program 118 may treat a request received from an administrator on behalf of a user 116 in the same manner as a request received directly from a user device 108.

Figure 2:
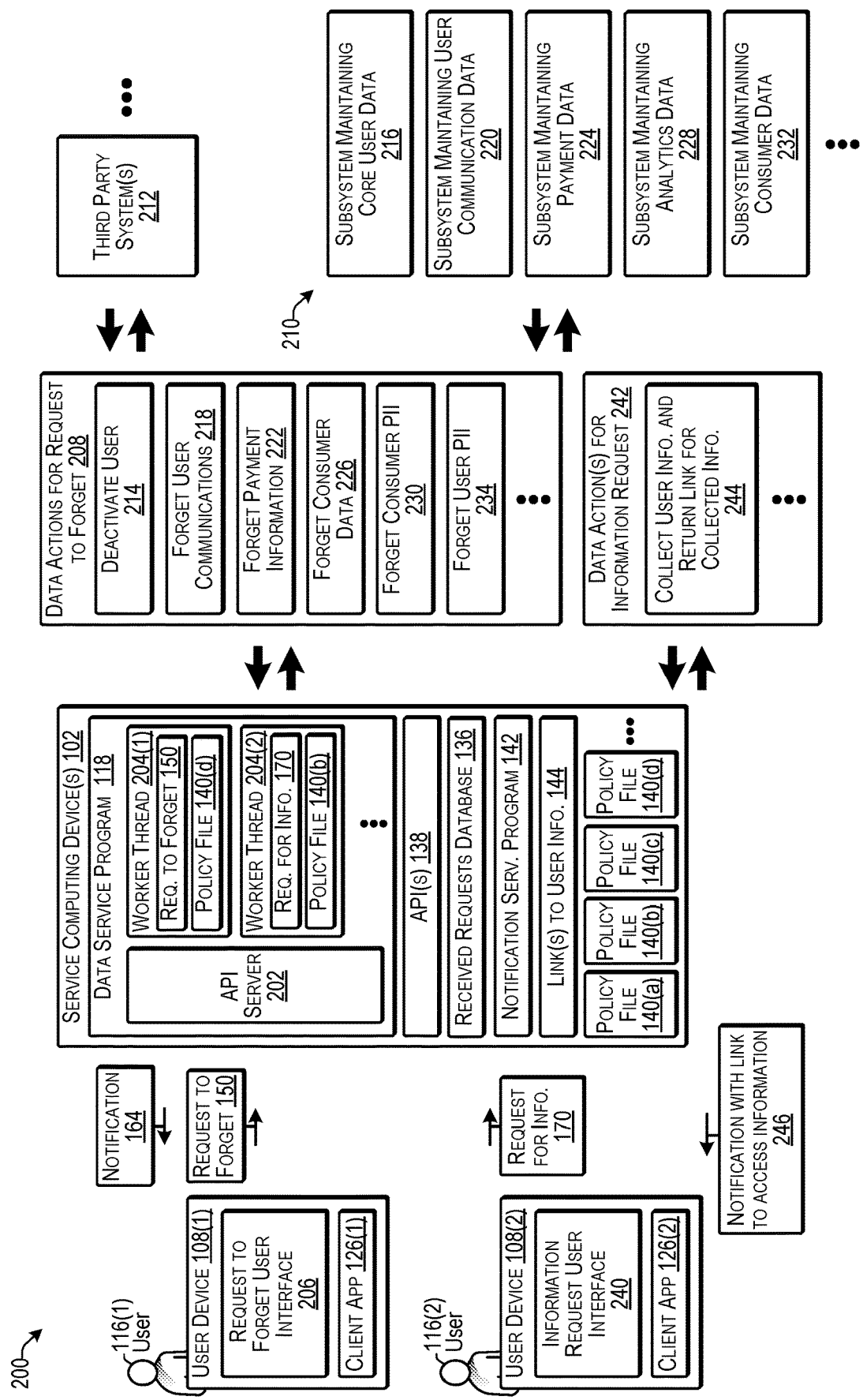
FIG. 2 illustrates an example logical configuration of the distributed computing system of FIG. 1 according to some implementations.

FIG. 2 illustrates an example logical configuration 200 of the distributed computing system 100 of FIG. 1 according to some implementations. In this example, similar to the example discussed above with respect to FIG. 1, the data service program 118 provides an API server 202 based on the one or more APIs 138. For instance, the API server 202 may include a web application that enables the user devices 108 to communicate with the service computing device(s) 102 via the API(s) 138 for receiving user requests, such as the request to forget 150 and the request for information 170 discussed above. Upon receipt of the request 150, 170, and following any validation of user credentials such as may be performed by the API server 202, the data service program 118 may store the received requests 150, 170 and the received request database 136.

The data service program 118 may execute a pool of worker threads 204(1), 204(2), . . . , that may be configured to access the received requests database 136 to a received request for processing. For instance, the requests for information 170 may be queued for processing right away, while in some cases, the requests to forget 150 may be delayed for a threshold time period such as one week, two weeks, three weeks, etc., or any other suitable amount of time permitted under the relevant jurisdiction. For example, the delay may provide the user sufficient time to retract the request and may help guard against fraud.

The worker threads 204 may be configured to select a request from the received request database 136, such as based on a first-in-first-out selection technique (taking into account the delay period for requests to forget) or any other suitable selection technique. Following selection of a request for processing, the worker thread 204 may access a user profile of the user who submitted the request to determine a user type, user location and applicable legal jurisdiction, services for which the user is registered, and the like. Based on the request type and the user information, the worker thread 204 may select a specific one of the policy files 140 from among the plurality of policy files 140, and may instruct the data actions within the selected policy file 140 for responding to the user request.

As one example, suppose that the first user 116(1) causes the first user device 108(1) to execute the first client application 126(1) to send the request to forget 150 to the service computing device(s) 102. For instance, the client application 126(1) may display a request-to-forget user interface 206 that enables the first user 116(1) to select a virtual control for submitting a request to forget that requests the service-providing entity to forget the first user and the first user's information. In response, the API server 202 may store the request to forget 150 in the received request database 136 and may send notification 164, such as an acknowledgment, to the user device 108(1) to acknowledge receipt and acceptance of the request to forget 150. In some cases, the notification service program 142 may be invoked to send the notification 164.

Subsequently, such as following the elapse of a predetermined threshold period of time, suppose that a worker thread 204(1) selects the request to forget 150 for processing. The worker thread 204(1) may determine the user type of the first user 116(1) such as consumer, independent contractor, employee, partner business, or the like. For example, the worker thread 204(1) may access a user profile of the first user 116(1), such as based on a user identifier (ID) transmitted with the request to forget 150 via the API 138, or may otherwise determine the user ID based on the received request to forget 150. Upon accessing the user profile of the first user 116(1), the worker thread 204(1) may further determine a user location of the first user 116(1) which is indicative of the jurisdiction requirements applicable for the first user 116(1). For example, a user location may be determined based on a designated address of the first user 116(1) previously provided by the first user 116(1), such as when initially signing up for the service provided by the service-providing entity. The worker thread 204(1) may also determine a request type of the request to forget 150.

In addition, in some cases a user may have more than one user type. For example, a user may be both a consumer and an independent contractor. Accordingly, the worker thread 204(1) may determine the capacity in which the user is submitting the request, such as based on the user interface 206 used to submit the request. For instance, the user 116 may have a separate login to a consumer account and a separate login for an independent contractor account. Thus, the worker thread 204(1) may detect from the user request an indicator that indicates whether the user request was received from a consumer user interface presented to consumers or an independent contractor user interface presented to independent contractors.

Further, in some examples, the service-providing entity may offer a plurality of different services to various different users. For example, a first user might sign up for a first service offered by the entity, while a second user may sign up for a second service but not sign up for the first service. Accordingly, the users may also be identified according to the service which they are registered, and various different policy files 140 may be applicable for various different users of various different services, respectively, offered by the service-providing entity.

Additionally, in some examples, the data service program 118 and/or a worker thread 204 may determine the user type immediately upon receipt of the request to forget 150, such as in the case that some types of users, such as employees, may not be eligible for submitting a request to forget. In such a case, the data service program 118 may return a notification indicating that the request to forget received from an ineligible user has been denied and will not be processed. In such a situation, the notification may be returned to the requesting user immediately, rather than waiting for the specified delay period.

In the example herein, suppose that the first user 116(1) is a consumer and is eligible for submitting the request to forget 150. Accordingly, based on the information determined about the first user 116(1) from the user profile of the first user 116(1), and based on determining that the received request is a request to forget 150, the worker thread 204(1) may select a corresponding one of the policy files 140(*a*), 140(*b*), 140(*c*), 140(*d*), . . . , for responding to the request to forget 150. For instance, suppose that the worker thread 204(1) selects policy file 140(*d*) as the policy file configured for responding to a request to forget received from a consumer located in the particular legal jurisdiction and having subscribed to services that were provided to the first user 116(1). Based on the contents of the selected policy file 140(*d*), the worker thread 204(1) may send, for performing the request to forget 150, a plurality of data actions 208 that conform to the requirements of the determined jurisdiction. For example, the respective data actions 208 may be sent to respective entity subsystems 210 provided by the entity subsystem computing devices 104, and/or to one or more third-party systems 212.

As mentioned above, in some cases, the data actions 208 may be, or may be similar to, service level agreements, or the like. As one example, each data action 208 may be a file, such as a JSON file, or other type of data structure. Each data action 208 may have a data action ID that is unique from other data action IDs. In addition, each data action 208 may identify the target subsystem responsible for executing the action, a location to which the data action request is to be sent, and a response location to which the responsible target subsystem is to communicate a response status, such as "completion", "error", or the like. The data action 208 may represent what the target subsystem is requested to do, while the actual implementation of the details for performing the requested data action may be determined by the target subsystem. Furthermore, some data actions 208 may have dependencies on other data actions 208, and therefore, the order in which these data actions 208 are instructed to the respective target subsystems may be controlled, such as based on receiving a response to a previous data action 208 before sending a next data action 208. In some cases, an Acknowledge API may be used to receive data action acknowledgements from the target subsystems 210 in response to the various data actions 208. Further, in some examples, the data actions responses may include an acknowledgement indicating that the request to forget has been performed, and may include a timestamp indicating the time at which the request to forget was performed, such as to facilitate auditing or other verification.

In this example, the data actions 208 for responding to a request to forget may include an instruction to deactivate user 214 that may be sent to a subsystem 216 maintaining core user data; an instruction to forget user communications 218 that may be sent to a subsystem 220 maintaining user communication data; an instruction to forget payment information 222 that may be sent to a subsystem 224 maintaining payment data; an instruction to forget consumer data 226 that may be sent to a subsystem 228 maintaining analytics data; an instruction to forget consumer personally identifiable information (PII) 230 that may be sent to a subsystem 232 maintaining consumer data; and an instruction to forget user PII 234 that may be sent to the subsystem 216 maintaining core user data. In some cases, one or more of the data actions 208 may also be sent to the third-party system(s) 212 to perform the request to forget 150.

Furthermore, different ones of the data actions 208 may be sent using different communication protocols. As one example, a first set of the data actions 208 may be sent using GRPC communications, while a second set of the data actions 208 may be sent using a KAFKA messaging queue. For instance, GRPC is an example of a communication protocol that may enable a remote procedure call (RPC) framework that can connect services in and across data centers, data clusters, individual servers, and so forth, and may also connect devices and browsers to backend services. On the other hand, KAFKA is an example of a messaging queue to which the worker thread 204(1) may add data actions for particular target subsystems. The target subsystems may access the messaging queue for receiving instructions from the worker thread 204(1). Furthermore, while two examples of communication techniques are described above, numerous other communication techniques for communicating the data actions to respective subsystems will be apparent to those of skill in the art having the benefit of the disclosure herein.

As another example, suppose that the second user 116(2) uses the client application 126(2) on the second user device 108(2) to send the request for information 170 to the service computing device(s) 102, such as via the one or more APIs 138. For instance, the client application 126(2) may display an information request user interface 240 that enables the second user 116(2) to select a virtual control for submitting the request for information 170 which requests that the service-providing entity provide all the information about the second user 116(2) that is maintained by the service-providing entity. As one example, the request for information 170 may be a request for any personal information about the user stored by the service-providing entity. In some examples, the system 200 may include a downstream subsystem, such as the subsystem 228 maintaining analytics data, that also is configured to collect and maintain an archive-type file of personal data of each user 116 to enable quick retrieval of user data in response to a user request for information. In other examples, a policy file 140 for responding to the request for information may include a plurality of data actions for retrieving the requested personal data of an individual user 116 from a plurality of services and subsystems distributed throughout the system 200, and the data service program 118 or other subsystem may assemble the collected user data for responding to the user request for information 170.

The request for information 170 may be received by the API server 202 and may be stored to the received requests database 136, such as following any verification of credentials of the second user 116(2) performed by the API server 202. In some examples, the data service program 118 may send an acknowledgment to the user device 108(2) to acknowledge receipt of the request for information 170, such as via the API 138, or through the notification service program 142.

Similar to the first example discussed above, an available executing worker thread 204(2) may access the received request database 136 and select the request for information 170 for processing, such as on a FIFO basis. The worker thread 204(2) may determine the type of request, and based on information included in the request, such as a user ID of the second user 116(2), may access the user profile of the second user 116(2) to determine a user type, user location, user legal jurisdiction, services for which the user is registered, and the like. Accordingly, based on this information about the user and the request type, the worker thread 204(2) may select a particular policy file 140 to use for responding to the request 170, such as policy file 140(b) in this example.

Using the selected policy file 140(b), the worker thread 204(2) may send one or more data actions 242 for the information request. In particular, suppose that the policy file 140 D includes at least one data action 244 which is an instruction for the subsystem 228 maintaining analytics data to collect user information and return a link for the collected user information to the worker thread 204(2) at the service computing device(s) 102. As one example, the subsystem 228 maintaining analytics data may collect all the information maintained by the entity subsystems 210 provided by the entity subsystem computing devices 104, and may store this collected information in a zip file or other data structure at a network storage location. Furthermore, the subsystem 228 maintaining analytics data may return a link to the network storage location to the worker thread 204(2). For example, the worker thread 204(2) may store the link with the links to the user information 144 stored by the service computing device(s) 102.

Upon receipt of the link to user information 144, the worker thread 204(2) may invoke the notification service program 142 to send a notification 246 with the link for the network location to the user device 108(2) indicating that the requested user information is available to be accessed by the user 116(2). As one example, the user 116(2) may select the link to download or otherwise view the user information stored at the network storage location. In some cases, the user's credentials may be verified before providing access to the user information. In some examples, the collected user information may be maintained available to be accessed by the user 116(2) for threshold time period, and may then be removed from the storage location and/or access by the user 116(2) may be terminated or otherwise restricted. For instance, the data action 244 may specify an expiration time after which the information file may be deleted and/or further access by the user 116(2) may be denied.

Figure 3:
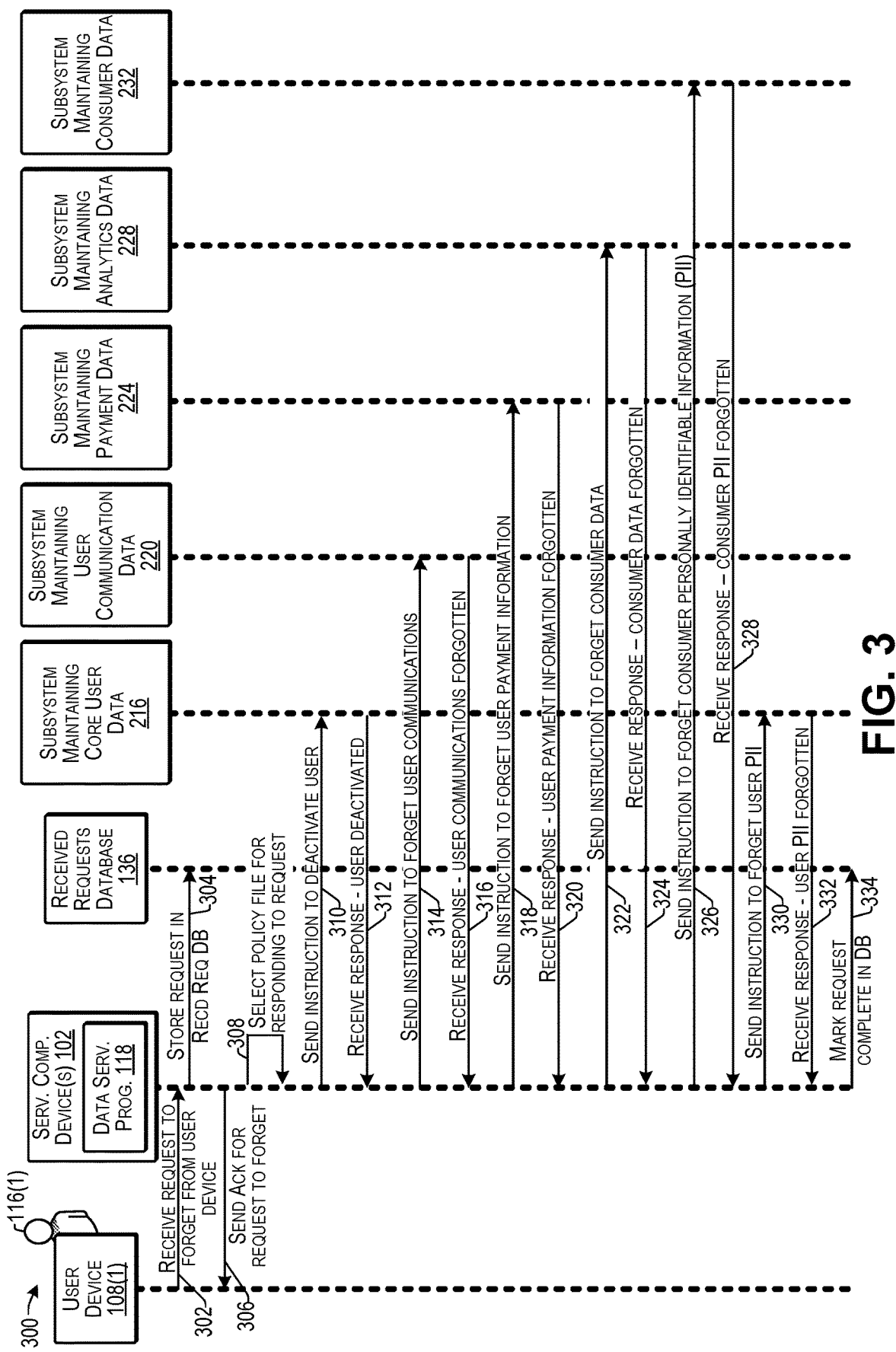
FIG. 3 is a sequence diagram illustrating an example process for responding to a user request to forget according to some implementations.
Figure 4:
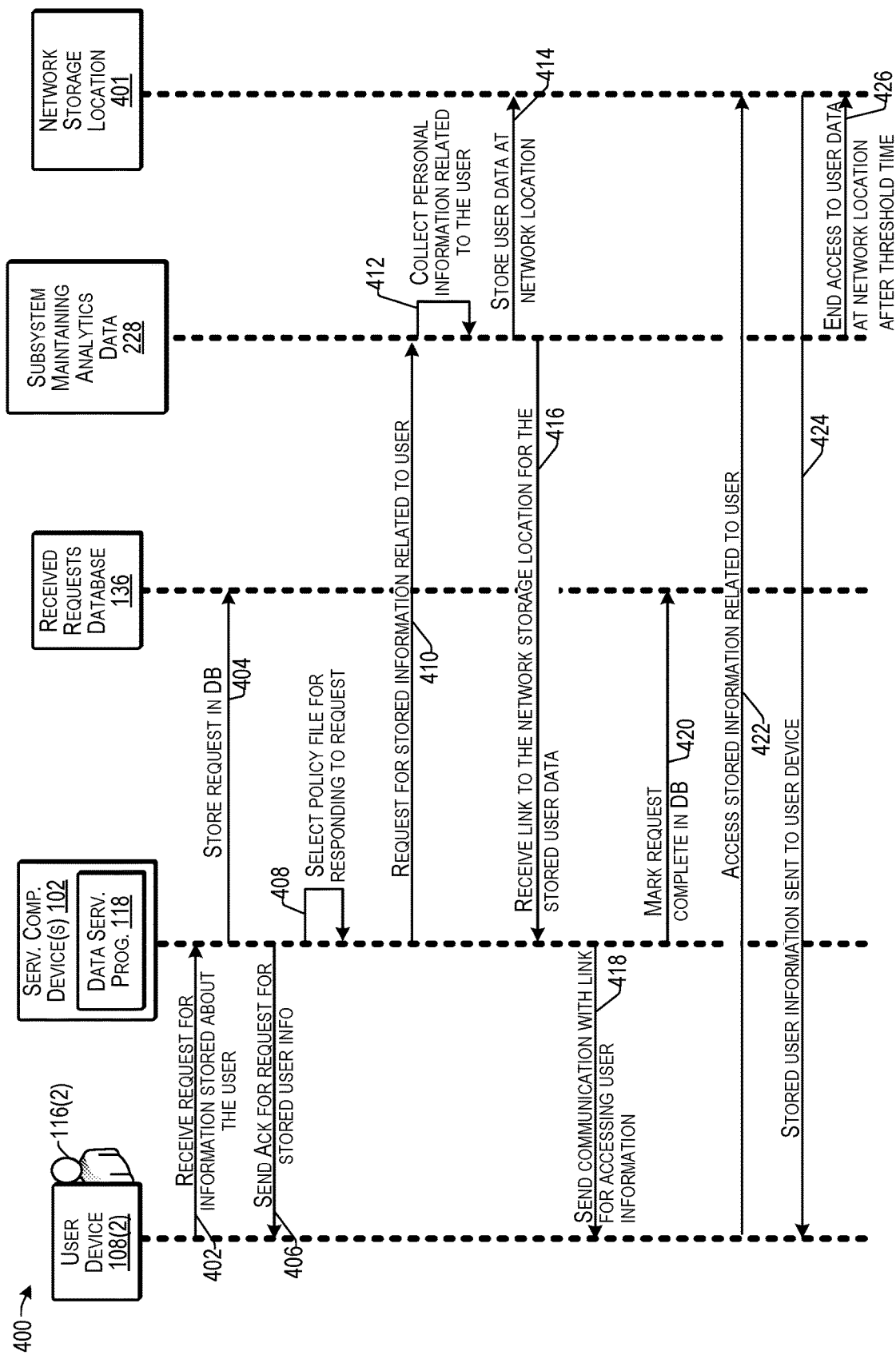
FIG. 4 is a sequence diagram illustrating an example process for responding to a user request for information according to some implementations.

FIGS. 3 and 4 set forth sequence diagrams illustrating example processes 300 and 400, respectively, for responding to user requests according to some implementations. The processes 300 and 400 are each illustrated as a sequence of operations, some or all of which may be implemented in hardware, software or a combination thereof. In the context of software, the operations may represent computer-executable instructions stored on one or more computer-readable media that, when executed by one or more processors, program the processors to perform the recited operations. The order in which the operations are described should not be construed as a limitation. For example, some operations may be performed in a different order and/or in parallel to implement the process, or alternative processes, and not all of the operations need to be executed. For discussion purposes, the processes 300 and 400 are described with reference to the environments, frameworks, and systems described in the examples herein, although the processes 300 and 400 may be implemented in a wide variety of other environments, frameworks, and systems.

FIG. 3 is a sequence diagram illustrating an example process 300 for responding to a user request to forget according to some implementations. The example sequence diagram 300 of FIG. 3 includes the user device 108(1), the data service program 118 executable on the service computing device(s) 102, the received requests database 136, which may be maintained or otherwise accessed by the service computing device(s) 102, the subsystem 216 maintaining core user data, the subsystem 220 maintaining user communication data, the subsystem 224 maintaining payment data, the subsystem 228 maintaining analytics data, and the subsystem 232 maintaining consumer data, each of which may be provided by one or more of the entity subsystem computing devices 104 discussed above with respect to FIG. 1.

At 302, the service computing device(s) 102 may receive, from the user device 108(1), a request to forget the information of the user maintained by the service-providing entity.

At 304, the service computing device(s) 102 may store the request to forget in the received requests database 136.

At 306, the service computing device(s) 102 may send an acknowledgment to the user device 108(1) in response to the request to forget received from the user device 108(1). As one example, the acknowledgment may be sent by invoking a notification service program as discussed above, e.g., with respect to FIGS. 1 and 2. In other examples, the acknowledgment may be sent by an API server implemented on the service computing device(s) 102.

At 308, the service computing device(s) 102 may select a policy file for responding to the received request. For example, the policy file may be selected based on the request type, user type, jurisdiction applicable to the user location, services for which the user is registered, and so forth. The service computing device may perform the remaining operations based on the data actions included in the selected policy file. In some examples, the selection of the policy file and/or the remaining operations may be performed by execution of a worker thread from a pool of worker threads executed by the data service program 118 on the service computing device(s) 102.

At 310, in response to receiving the request to forget, and based on the data actions in the selected policy file, the service computing device(s) 102, may send, to the subsystem 216 maintaining core user data, an instruction to deactivate the first user.

At 312, the service computing device(s) 102 may receive a response from the subsystem 216 maintaining core user data indicating that the user has been deactivated at the subsystem 216.

At 314, the service computing device(s) 102 may send, to the subsystem 220 maintaining user communication data, an instruction to forget user communications. For example, the subsystem 220 maintaining user communication data may be instructed to unsubscribe the user from receiving any future communications from the subsystem 220, and further, to forget any communications with the user in the past.

At 316, the service computing device(s) 102 may receive, from the subsystem 220 maintaining user communication data, a response indicating that the user communications have been forgotten and that the user has been unsubscribed from any future communications from the subsystem 220.

At 318, the service computing device(s) 102 may send, to the subsystem 224 maintaining payment data, an instruction to forget user payment information.

At 320, the service computing device(s) 102 may receive, from the subsystem 224 maintaining payment data, a response indicating that the user payment information has been forgotten from the subsystem 224.

At 322, the service computing device(s) 102 may send, to the subsystem 228 maintaining analytics data, an instruction to forget consumer data associated with the user.

At 324, the service computing device(s) 102 may receive, from the subsystem 228 maintaining analytics data, a response indicating that the consumer data maintained by the subsystem 228 has been forgotten.

At 326, the service computing device(s) 102 may send, to the subsystem 232 maintaining consumer data, an instruction to forget consumer personally identifiable information (PII) of the user.

At 328, the service computing device(s) 102 may receive, from the subsystem 232 maintaining consumer data, a response indicating that the consumer personally identifiable information of the user has been forgotten by the subsystem 232.

At 330, the service computing device(s) 102 may send, to the subsystem 216 maintaining core user data, an instruction to forget user personally identifiable information.

At 332, the service computing device(s) 102 may receive, from the, a response indicating that the user personally identifiable information has been forgotten by the subsystem 216 maintaining core user data.

At 334, based on having received all the responses 312, 316, 320, 324, 328, and 332 from the respective subsystems 216, 220, 224, 228, and 232, the service computing device(s) 102 may mark the request to forget complete in the received requests database 136.

FIG. 4 is a sequence diagram illustrating an example process 400 for responding to a user request for information according to some implementations. The example sequence diagram 400 includes the user device 108(2), the data service program 118 executable on the service computing device(s) 102, the subsystem 228 maintaining analytics data, and a network storage location 401. Accordingly, the process 400 may be executed in part by the service computing device(s) 102, the user device 108(2), the entity subsystem computing device(s) 104, and the network storage location 401.

At 402, the service computing device(s) 102 may receive, from the user device 108(2), a request for information stored about the user 116(2).

At 404, the service computing device(s) 102 may store the received request in the received request database 136.

At 406, the service computing device(s) 102 may send an acknowledgment to the user device 108(2) in response to the request for information. As one example, the acknowledgment may be sent by invoking a notification service program as discussed above, e.g., with respect to FIGS. 1 and 2. In other examples, the acknowledgment may be sent by an API server implemented on the service computing device(s) 102.

At 408, the service computing device(s) 102 may select a policy file for responding to the received request. For example, the policy file may be selected based on the request type, user type, jurisdiction applicable to the user location, services for which the user is registered, and so forth. The service computing device may perform the remaining operations based on the data actions included in the selected policy file. In some examples, the selection of the policy file and/or the remaining operations may be performed by execution of a worker thread from a pool of worker threads executed by the data service program 118 on the service computing device(s) 102.

At 410, the service computing device(s) 102 may send, to the subsystem 228 maintaining analytics data, a request for stored information related to the user.

At 412, the request sent by the service computing device(s) 102 may cause the subsystem 228 maintaining analytics data to collect personal information related to the user if not already collected and stored in an archive file.

At 414, the subsystem 228 maintaining analytics data may store the user data at the network storage location 401. In some examples, the network storage location 401 may be a cloud storage location accessible over the Internet that may be accessed by a user device as discussed additionally below.

At 416, the service computing device(s) 102 may receive, from the subsystem 228 maintaining analytics data, a link to the network storage location at which the user data was stored by the subsystem 228.

At 418, the service computing device(s) 102 may send, to the user device 108(2), a communication with information for accessing the user information, such as a selectable link. As one example, the link may be a URL (uniform resource locator) or the like, which, when accessed, enables the user device 108(2) to download or otherwise receive the user information stored at the network storage location 401.

At 420, the service computing device(s) 102 may mark the request complete in the received requests database based at least on having sent the link to the user device 108(2).

At 422, the user device 108(2) may receive a selection of the link to access the stored information related to the user at the network storage location 401.

At 424, the stored user information may be sent to the user device 108(2) in response to the selection of the link at the user device 108(2).

At 426, following expiration of a threshold time period, the subsystem 228 may end access to the user data at the network location, such as by deleting the user data file from the network storage location 401 or by otherwise disabling access to the user data file.

Figure 5:
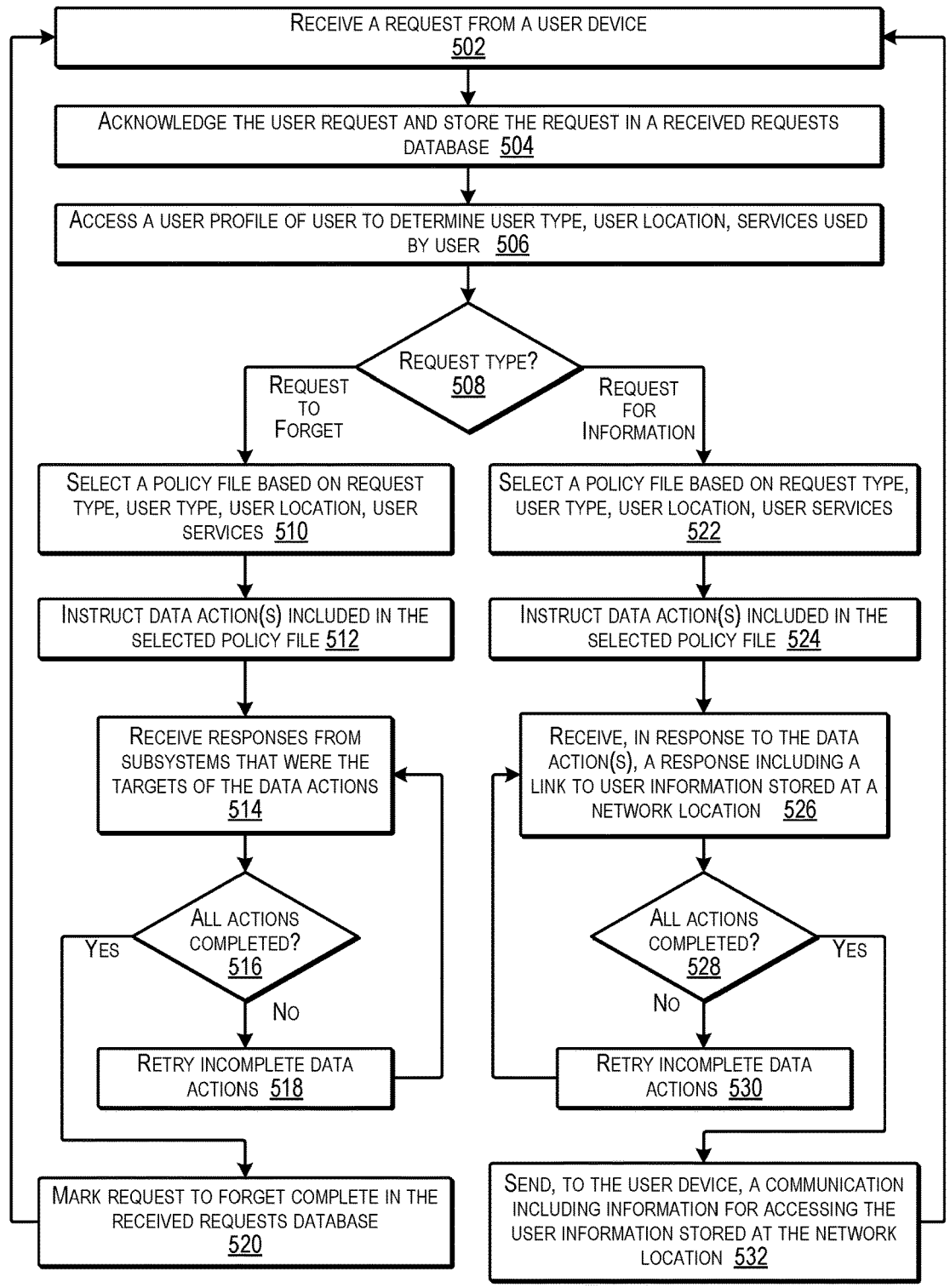
FIG. 5 is a flow diagram illustrating an example process for responding to user requests according to some implementations.

FIG. 5 is a flow diagram illustrating an example process 500 for responding to user requests according to some implementations. For instance, the process 500 of FIG. 5 is illustrated as a collection of blocks in a logical flow diagram, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, architectures and systems described in the examples herein, although the process may be implemented in a wide variety of other environments, architectures and systems. In some examples, the process 500 may be executed by the service computing device(s) 102, at least in part, by execution of the data service program 118.

At 502, the service computing device(s) 102 may receive a request from a user device. For example, the received request may be a user data request, such as a request to forget user data or a request for information related to the user.

At 504, the service computing device(s) 102 may acknowledge the user request and may store the received request in a received request database.

At 506, the service computing device(s) 102 may access a user profile of the user to determine a user type, a user location, services used by the user, such as services for which the user has signed up, and the like.

At 508, the service computing device(s) 102 may determine the request type. For example, the request type may be indicated by an API based on the user interface from which the user request is received. If the user request is a request to forget, the process goes to 510. If the user request is a request for information related to the user, the process goes to 522.

At 510, the service computing device(s) 102 may select a policy file based on request type, user type, user location, user services.

At 512, the service computing device(s) 102 may perform data action(s) from the selected policy file.

At 514, the service computing device(s) 102 may Receive responses from services that were the targets of the policy actions.

At 516, the service computing device(s) 102 may determine whether all data actions have been completed. If so, the process goes to 520. If not, the process goes to 518.

At 518, the service computing device(s) 102 may retry an incomplete data action. For example, if an error was returned, the service computing device(s) 102 may retry the data action. If an error continues to be received, the error may be forwarded to the administrator computing device.

At 520, the service computing device(s) 102 may mark the request to forget complete in the received requests database.

At 522, based on determining that request type is a request for information, the service computing device(s) 102 may select a policy file based on the request type, user type, user location, user services, and so forth.

At 524, the service computing device(s) 102 may instruct data action(s) included in the selected policy file.

At 526, the service computing device(s) 102 may receive, in response to the data action(s), a response including information for accessing user information stored at a network location. For instance, the information for accessing the user information may include a link, such as URL, or the like.

At 528, the service computing device(s) 102 may determine whether all data actions have been completed. If so, the process goes to 532. If not, the process goes to 530.

At 530, the service computing device(s) 102 may retry an incomplete data action. For example, if an error was returned, the service computing device(s) 102 may retry the data action. If an error continues to be received, the error may be forwarded to the administrator computing device.

At 532, the service computing device(s) 102 may send, to the user device, a communication including information for accessing the user information stored at the network location. For instance, the information for accessing the user information may include a link, such as URL, or the like.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
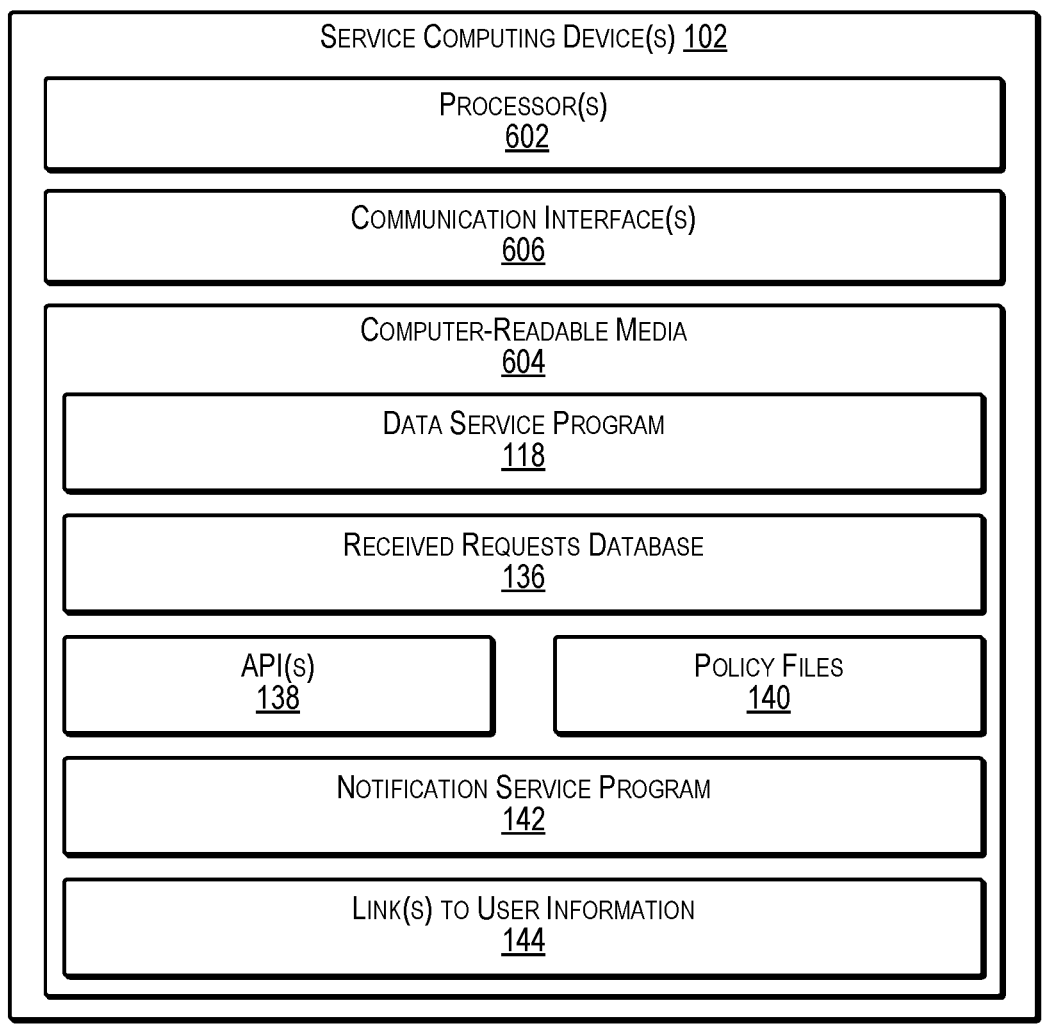
FIG. 6 illustrates select example components of a service computing device that may be used to implement at least some of the techniques and functions described herein.

FIG. 6 illustrates select example components of a service computing device(s) 102 that may be used to implement at least some of the techniques and functions described herein. The service computing device(s) 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102 includes, or may have associated therewith, one or more processors 602, one or more computer-readable media 604, and one or more communication interfaces 606. Each processor 602 may be a single processing unit or a number of processing units, and may include single or multiple computing units, or multiple processing cores. The processor(s) 602 can be implemented as one or more central processing units, microprocessors, microcomputers, microcontrollers, digital signal processors, state machines, logic circuitries, and/or any devices that manipulate signals based on operational instructions. As one example, the processor(s) 602 may include one or more hardware processors and/or logic circuits of any suitable type specifically programmed or configured to execute the algorithms and processes described herein. The processor(s) 602 may be configured to fetch and execute computer-readable instructions stored in the computer-readable media 604, which may program the processor(s) 602 to perform the functions described herein.

The computer-readable media 604 may include volatile and nonvolatile memory and/or removable and non-removable media implemented in any type of technology for storage of information, such as computer-readable instructions, data structures, programs, program modules, or other data. For example, the computer-readable media 604 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device(s) 102, the computer-readable media 604 may be a tangible non-transitory medium to the extent that, when mentioned, non-transitory computer-readable media exclude media such as energy, carrier signals, electromagnetic waves, and/or signals per se. In some cases, the computer-readable media 604 may be at the same location as the service computing device(s) 102, while in other examples, the computer-readable media 604 may be partially remote from the service computing device(s) 102 such as at a network location accessed over the one or more networks 106.

The computer-readable media 604 may be used to store any number of functional components that are executable by the processor(s) 602. In many implementations, these functional components comprise instructions or programs that are executable by the processor(s) 602 and that, when executed, specifically program the processor(s) 602 to perform the actions attributed herein to the service computing device(s) 102. Functional components stored in the computer-readable media 604 may include the data service program 118 and the notification service program 142, as discussed above, each of which may include one or more computer programs, applications, modules, executable code, or portions thereof.

In addition, the computer-readable media 604 may store data, data structures, and other information used for performing the functions and services described herein. For example, the computer-readable media 604 may store the received requests database 136, the policy files 140, and the link(s) to user information 144. The computer-readable media may also store the API(s) 138 for communication with the user devices 108, the entity subsystem computing devices 104, the third party computing device(s) 110, and/or the administrator device(s) 114 in some examples. The service computing device(s) 102 may also include or maintain other functional components and data, which may include an operating system, programs, drivers, etc., and the data used or generated by the functional components. Further, the service computing device(s) 102 may include many other logical, programmatic, and physical components, of which those described above are merely examples that are related to the discussion herein.

The one or more communication interfaces 606 may include one or more software and hardware components for enabling communication with various other devices, such as over the one or more network(s) 106. For example, the communication interface(s) 606 may enable communication through one or more of a LAN, WAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

In addition, in some examples, the entity subsystem computing device(s) 104, the user computing devices 108, the third party computing devices 110, and/or the administrator computing device(s) 114 may have hardware and software configurations similar to that of the service computing device(s) 102 discussed above, but with different functional components as described elsewhere herein, such as discussed with respect to FIGS. 1 and 2.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors configured by executable instructions to perform operations including:
receiving, by the one or more processors, a user request from a user device;
determining, by the one or more processors, a user jurisdiction associated with the received user request;
based at least on a request type of the user request and the user jurisdiction, selecting, by the one or more processors, a first policy file from among a plurality of policy files, the plurality of policy files preconfigured for respective different combinations of at least the request type and the user jurisdiction, wherein the first policy file specifies a plurality of data actions for instructing a plurality of target subsystems, respectively, to each perform at least one data action of the plurality of data actions in response to the user request; and
sending, by the one or more processors, based on the plurality of data actions included in the first policy file, instructions to the plurality of target subsystems.

2. The system as recited in claim 1, the operations further comprising:
receiving the user request via an application programming interface communication;
storing a record for the received user request in a data structure; and
based at least on receiving a response from at least one target subsystem, associating an indication of completion of the user request with the record in the data structure.

3. The system as recited in claim 2, the operations further comprising:
executing, by the one or more processors, a pool of worker threads configured to periodically check the data structure for requests,
wherein a first worker thread of the pool of worker threads selects the received user request and performs the operations of selecting the first policy file and sending, for the plurality of data actions included in the first policy file, the instructions to the plurality of target subsystems.

4. The system as recited in claim 1, wherein the operation of sending the instructions to the plurality of target subsystems comprises at least one of sending one or more of the instructions via a remote procedure call or adding one or more of the instructions to a messaging queue, and
wherein the plurality of target subsystems are configured to at least one of receive the remote procedure call or retrieve the instruction one or more instructions from the messaging queue for performing instructed data actions.

5. The system as recited in claim 1, wherein:
the received user request is a request to forget user data of a user associated with the received user request,
the plurality of subsystems targeted by the instructions use data associated with the user for performing respective services, and
the plurality of data actions include instructions to forget data related to the user.

6. The system as recited in claim 1, wherein:
the received user request is a request for information related to a user associated with the received user request, and
the first policy file includes a data action targeting a subsystem configured to store the information related to the user at a network storage location and return information indicating the network storage location.

7. The system as recited in claim 6, the operations further comprising sending, to the user device, in response to the received user request, the information indicating the network storage location.

8. A method comprising:
receiving, by one or more processors, a user request;
determining, by the one or more processors, a user jurisdiction associated with the received user request;
based at least on a request type and the user jurisdiction, selecting, by the one or more processors, a first policy file from among a plurality of policy files, the plurality of policy files preconfigured for respective different combinations of at least the request type and the user jurisdiction, wherein the first policy file specifies a plurality of data actions for instructing a plurality of target subsystems, respectively to each perform at least one data action of the plurality of data actions in response to the user request; and
sending, by the one or more processors, based on the plurality of data actions included in the first policy file, instructions to the plurality of target subsystems.

9. The method as recited in claim 8, further comprising:
receiving the user request via an application programming interface communication;
storing a record for the received user request in a data structure; and
based at least on receiving a response from at least one target subsystem, associating an indication of completion of the user request with the record in the data structure.

10. The method as recited in claim 9, further comprising:
executing, by the one or more processors, a pool of worker threads configured to periodically check the data structure for requests,
wherein a first worker thread of the pool of worker threads selects the received user request and performs the operations of selecting the first policy file and sending, for the plurality of data actions included in the first policy file, the instructions to the plurality of target subsystems.

11. The method as recited in claim 8, wherein:
sending the instructions to the plurality of target subsystems comprises at least one of sending one or more of the instructions via a remote procedure call or adding one or more of the instructions to a messaging queue, and the plurality of target subsystems are configured to at least one of receive the remote procedure call or retrieve the one or more instructions from the messaging queue for performing instructed data actions.

12. The method as recited in claim 8, wherein:
the received user request is a request to forget user data of a user associated with the received user request,
the plurality of subsystems targeted by the instructions use data associated with the user for performing respective services, and
the plurality of data actions include instructions to forget data related to the user.

13. The method as recited in claim 8, wherein:
the received user request is a request for information related to a user associated with the received user request, and
the first policy file includes a data action targeting a subsystem configured to store the information related to the user at a network storage location and return information indicating the network storage location.

14. The method as recited in claim 8, further comprising:
determining one or more services associated with a user associated with the user request; and
selecting the first policy file further includes selecting the first policy file based in part on the one or more services associated with the user.

15. A non-transitory computer-readable medium storing instructions executable to configure one or more processors associated with a service to perform operations comprising:
receiving, by the one or more processors, a user request associated with a user, the user request for the service to one of: forget user data associated with the user that is maintained by the service, or provide information related to the user that is maintained by the service;
determining, by the one or more processors, a user jurisdiction associated with the received user request;
based at least on the user request and the user jurisdiction, selecting, by the one or more processors, a first policy file from among a plurality of policy files, the plurality of policy files preconfigured for different jurisdictions, wherein the first policy file specifies a plurality of data actions for instructing a plurality of target subsystems, respectively, to each perform at least one data action of the plurality of data actions in response to the user request; and
sending, based on the plurality of data actions included in the first policy file, instructions to the plurality of target subsystems.

16. The non-transitory computer-readable medium as recited in claim 15, the operations further comprising:
receiving the user request via an application programming interface communication;
storing a record for the received user request in a data structure; and
based at least on receiving a response from at least one target subsystem, associating an indication of completion of the user request with the record in the data structure.

17. The non-transitory computer-readable medium as recited in claim 16, the operations further comprising:
executing, by the one or more processors, a pool of worker threads configured to periodically check the data structure for requests,
wherein a first worker thread of the pool of worker threads selects the received user request and performs the operations of selecting the first policy file and sending, for the plurality of data actions included in the first policy file, the instructions to the plurality of target subsystems.

18. The non-transitory computer-readable medium as recited in claim 16, wherein the operation of sending the instructions included in the first policy file to the plurality of target subsystems comprises at least one of sending one or more of the instructions via a remote procedure call or adding one or more of the instructions to a messaging queue, and
wherein the plurality of target subsystems are configured to at least one of receive the remote procedure call or retrieve the one or more instructions from the messaging queue for performing instructed data actions.

19. The non-transitory computer-readable medium as recited in claim 15, wherein:
the received user request is a request to forget user data of a user associated with the received user request,
the plurality of subsystems targeted by the instructions use data associated with the user for performing respective services, and
the plurality of data actions include instructions to forget data related to the user.

20. The non-transitory computer-readable medium as recited in claim 19, wherein:
the received user request is a request for information related to a user associated with the received user request,
the first policy file includes a data action targeting a subsystem configured to store the information related to the user at a network storage location and return information indicating the network storage location, and
the operations further comprise sending, to the user device, in response to the received user request, the information indicating the network storage location.

\* \* \* \* \*